United States Patent
Gass

(10) Patent No.: US 7,621,205 B2
(45) Date of Patent: Nov. 24, 2009

(54) BAND SAW WITH SAFETY SYSTEM

(75) Inventor: Stephen F. Gass, Wilsonville, OR (US)

(73) Assignee: SD3, LLC, Tualatin, OR (US)

( * ) Notice: Subject to any disclaimer, the term of this patent is extended or adjusted under 35 U.S.C. 154(b) by 359 days.

(21) Appl. No.: 11/218,356

(22) Filed: Sep. 2, 2005

(65) Prior Publication Data

US 2006/0000337 A1  Jan. 5, 2006

Related U.S. Application Data

(60) Division of application No. 10/146,527, filed on May 15, 2002, and a continuation of application No. 09/676,190, filed on Sep. 29, 2000, now Pat. No. 7,055,417, and a continuation of application No. 09/929,426, filed on Aug. 13, 2001, now Pat. No. 7,210,383, and a continuation of application No. 09/929,221, filed on Aug. 13, 2001, now Pat. No. 7,284,467, and a continuation of application No. 09/929,240, filed on Aug. 13, 2001, now Pat. No. 7,100,483, and a continuation of application No. 09/929,227, filed on Aug. 13, 2001, now Pat. No. 7,308,843, and a continuation of application No. 09/929,241, filed on Aug. 13, 2001, now Pat. No. 7,024,975, and a continuation of application No. 09/929,242, filed on Aug. 13, 2001, and a continuation of application No. 09/929,236, filed on Aug. 13, 2001, and a continuation of application No. 11/061,162, filed on Feb. 18, 2005, now Pat. No. 7,228,772, which is a continuation of application No. 09/929,244, filed on Aug. 13, 2001, now Pat. No. 6,857,345, application No. 11/218,356, which is a continuation of application No. 09/929,237, filed on Aug. 13, 2001, and a continuation of application No. 09/929,234, filed on Aug. 13, 2001, now Pat. No. 7,225,712, and a continuation of application No. 09/929,425, filed on Aug. 13, 2001, now Pat. No. 7,137,326, and a continuation of application No. 11/190,111, filed on Jul. 25, 2005, now Pat. No. 7,357,056, which is a continuation of application No. 09/929,226, filed on Aug. 13, 2001, now Pat. No. 6,920,814, application No. 11/218,356, which is a continuation of application No. 09/929,235, filed on Aug. 13, 2001, now Pat. No. 7,350,444.

(60) Provisional application No. 60/292,100, filed on May 17, 2001, provisional application No. 60/157,340, filed on Oct. 1, 1999, provisional application No. 60/182,866, filed on Feb. 16, 2000, provisional application No. 60/225,200, filed on Aug. 14, 2000, provisional application No. 60/225,211, filed on Aug. 14, 2000, provisional application No. 60/225,056, filed on Aug. 14, 2000, provisional application No. 60/225,170, filed on Aug. 14, 2000, provisional application No. 60/225,169, filed on Aug. 14, 2000, provisional application No. 60/225,089, filed on Aug. 14, 2000, provisional application No. 60/225,201, filed on Aug. 14, 2000, provisional application No. 60/225,212, filed on Aug. 14, 2000, provisional application No. 60/225,059, filed on Aug. 14, 2000, provisional application No. 60/225,094, filed on Aug. 14, 2000, provisional application No. 60/225,210, filed on Aug. 14, 2000, provisional application No. 60/225,206, filed on Aug. 14, 2000, provisional application No. 60/225,058, filed on Aug. 14, 2000.

(51) Int. Cl.
*A22B 5/16* (2006.01)
*B27G 19/00* (2006.01)

(52) U.S. Cl. .............................. 83/58; 83/62.1; 83/788; 83/790

(58) Field of Classification Search .................. 83/62.1, 83/DIG. 1, 58, 471, 490, 581, 471.1, 477.2, 83/788, 610, 820, 829, 793, 790, 792
See application file for complete search history.

(56) References Cited

U.S. PATENT DOCUMENTS

| | | |
|---|---|---|
| 146,886 A | 1/1874 | Doane et al. |
| 162,814 A | 5/1875 | Graves et al. |
| 261,090 A | 7/1882 | Grill |
| 264,412 A | 9/1882 | Kuhlmann |
| 299,480 A | 5/1884 | Kuhlman et al. |
| 302,041 A | 7/1884 | Sill |
| 307,112 A | 10/1884 | Groff |
| 509,253 A | 11/1893 | Shields |

| | | | | | |
|---|---|---|---|---|---|
| 545,504 A | 9/1895 | Hoover | 2,292,872 A | 8/1942 | Eastman |
| 869,513 A | 10/1907 | Pfeil | 2,299,262 A | 10/1942 | Uremovich |
| 941,726 A | 11/1909 | Pfalzgraf | 2,312,118 A | 2/1943 | Neisewander |
| 997,720 A | 7/1911 | Troupenat | 2,313,686 A | 3/1943 | Uremovich |
| 1,037,843 A | 9/1912 | Ackley | 2,328,244 A | 8/1943 | Woodward |
| 1,050,649 A | 1/1913 | Harrold et al. | 2,352,235 A | 6/1944 | Tautz |
| 1,054,558 A | 2/1913 | Jones | 2,377,265 A | 3/1945 | Rady |
| 1,074,198 A | 9/1913 | Phillips | 2,392,486 A | 1/1946 | Larsen |
| 1,082,870 A | 12/1913 | Humason | 2,402,232 A | 6/1946 | Baker |
| 1,101,515 A | 6/1914 | Adam | 2,425,331 A | 8/1947 | Kramer |
| 1,126,970 A | 2/1915 | Folmer | 2,434,174 A | 1/1948 | Morgan |
| 1,132,129 A | 3/1915 | Stevens | 2,452,589 A | 11/1948 | McWhirter et al. |
| 1,148,169 A | 7/1915 | Howe | 2,466,325 A | 4/1949 | Ocenasek |
| 1,154,209 A | 9/1915 | Rushton | 2,496,613 A | 2/1950 | Wooward |
| 1,205,246 A | 11/1916 | Mowry | 2,509,813 A | 5/1950 | Dineen |
| 1,228,047 A | 5/1917 | Reinhold | 2,517,649 A | 8/1950 | Frechtmann |
| 1,240,430 A | 9/1917 | Erickson | 2,518,684 A | 8/1950 | Harris |
| 1,244,187 A | 10/1917 | Frisbie | 2,530,290 A | 11/1950 | Collins |
| 1,255,886 A | 2/1918 | Jones | 2,554,124 A | 5/1951 | Salmont |
| 1,258,961 A | 3/1918 | Tattersall | 2,562,396 A | 7/1951 | Schutz |
| 1,311,508 A | 7/1919 | Harrold | 2,572,326 A | 10/1951 | Evans |
| 1,324,136 A | 12/1919 | Turner | 2,590,035 A | 3/1952 | Pollak |
| 1,381,612 A | 6/1921 | Anderson | 2,593,596 A | 4/1952 | Olson |
| 1,397,606 A | 11/1921 | Smith | 2,601,878 A | 7/1952 | Anderson |
| 1,427,005 A | 8/1922 | McMichael | 2,623,555 A | 12/1952 | Eschenburg |
| 1,430,983 A | 10/1922 | Granberg | 2,625,966 A | 1/1953 | Copp |
| 1,450,906 A | 4/1923 | Anderson | 2,626,639 A | 1/1953 | Hess |
| 1,464,924 A | 8/1923 | Drummond | 2,661,777 A | 12/1953 | Hitchcock |
| 1,465,224 A | 8/1923 | Lantz | 2,661,780 A | 12/1953 | Morgan |
| 1,496,212 A | 6/1924 | French | 2,675,707 A | 4/1954 | Brown |
| 1,511,797 A | 10/1924 | Berghold | 2,678,071 A | 5/1954 | Odium et al. |
| 1,526,128 A | 2/1925 | Flohr | 2,690,084 A | 9/1954 | Van Dam |
| 1,527,587 A | 2/1925 | Hutchinson | 2,695,638 A | 11/1954 | Gaskell |
| 1,551,900 A | 9/1925 | Morrow | 2,704,560 A | 3/1955 | Woessner |
| 1,553,996 A | 9/1925 | Federer | 2,711,762 A | 6/1955 | Gaskell |
| 1,582,483 A | 4/1926 | Runyan | 2,722,246 A | 11/1955 | Arnoldy |
| 1,590,988 A | 6/1926 | Campbell | 2,731,049 A | 1/1956 | Akin |
| 1,600,604 A | 9/1926 | Sorlien | 2,736,348 A | 2/1956 | Nelson |
| 1,616,478 A | 2/1927 | Watson | 2,737,213 A | 3/1956 | Richards et al. |
| 1,640,517 A | 8/1927 | Procknow | 2,758,615 A | 8/1956 | Mastriforte |
| 1,662,372 A | 3/1928 | Ward | 2,785,710 A | 3/1957 | Mowery, Jr. |
| 1,701,948 A | 2/1929 | Crowe | 2,786,496 A | 3/1957 | Eschenburg |
| 1,711,490 A | 5/1929 | Drummond | 2,810,408 A | 10/1957 | Boice et al. |
| 1,712,828 A | 5/1929 | Klehm | 2,839,943 A | 6/1958 | Caldwell et al. |
| 1,774,521 A | 9/1930 | Neighbour | 2,844,173 A | 7/1958 | Gaskell |
| 1,807,120 A | 5/1931 | Lewis | 2,850,054 A | 9/1958 | Eschenburg |
| 1,811,066 A | 6/1931 | Tannewitz | 2,852,047 A | 9/1958 | Odlum et al. |
| 1,879,280 A | 9/1932 | James | 2,873,773 A | 2/1959 | Gaskell |
| 1,896,924 A | 2/1933 | Ulrich | 2,876,809 A | 3/1959 | Rentsch et al. |
| 1,902,270 A | 3/1933 | Tate | 2,883,486 A | 4/1959 | Mason |
| 1,904,005 A | 4/1933 | Masset | 2,894,546 A | 7/1959 | Eschenburg |
| 1,910,651 A | 5/1933 | Tautz | 2,913,025 A | 11/1959 | Richards |
| 1,938,548 A | 12/1933 | Tautz | 2,913,581 A | 11/1959 | Simonton et al. |
| 1,938,549 A | 12/1933 | Tautz | 2,945,516 A | 7/1960 | Edgemond, Jr. et al. |
| 1,963,688 A | 6/1934 | Tautz | 2,954,118 A | 9/1960 | Anderson |
| 1,988,102 A | 1/1935 | Woodward | 2,957,166 A | 10/1960 | Gluck |
| 1,993,219 A | 3/1935 | Merrigan | 2,978,084 A | 4/1961 | Vilkaitis |
| 2,007,887 A | 7/1935 | Tautz | 2,984,268 A | 5/1961 | Vuichard |
| 2,010,851 A | 8/1935 | Drummond | 2,991,593 A | 7/1961 | Cohen |
| 2,020,222 A | 11/1935 | Tautz | 3,005,477 A | 10/1961 | Sherwen |
| 2,038,810 A | 4/1936 | Tautz | 3,011,529 A | 12/1961 | Copp |
| 2,075,282 A | 3/1937 | Hedgpeth | 3,011,610 A | 12/1961 | Stiebel et al. |
| 2,095,330 A | 10/1937 | Hedgpeth | 3,013,592 A | 12/1961 | Ambrosio et al. |
| 2,106,288 A | 1/1938 | Tautz | 3,021,881 A | 2/1962 | Edgemond, Jr. et al. |
| 2,106,321 A | 1/1938 | Guertin | 3,035,995 A | 5/1962 | Seeley et al. |
| 2,121,069 A | 6/1938 | Collins | 3,047,116 A | 7/1962 | Stiebel et al. |
| 2,131,492 A | 9/1938 | Ocenasek | 3,085,602 A | 4/1963 | Gaskell |
| 2,163,320 A | 6/1939 | Hammond | 3,105,530 A | 10/1963 | Peterson |
| 2,168,282 A | 8/1939 | Tautz | 3,129,731 A | 4/1964 | Tyrrell |
| 2,241,556 A | 5/1941 | MacMillin et al. | 3,163,732 A | 12/1964 | Abbott |
| 2,261,696 A | 11/1941 | Ocenasek | 3,184,001 A | 5/1965 | Reinsch et al. |
| 2,265,407 A | 12/1941 | Tautz | 3,186,256 A | 6/1965 | Reznick |
| 2,286,589 A | 6/1942 | Tannewitz | 3,207,273 A | 9/1965 | Jurin |

| Patent | Date | Name |
|---|---|---|
| 3,213,731 A | 10/1965 | Renard |
| 3,224,474 A | 12/1965 | Bloom |
| 3,232,326 A | 2/1966 | Speer et al. |
| 3,246,205 A | 4/1966 | Miller |
| 3,249,134 A | 5/1966 | Vogl et al. |
| 3,276,497 A | 10/1966 | Heer |
| 3,306,149 A | 2/1967 | John |
| 3,313,185 A | 4/1967 | Drake et al. |
| 3,315,715 A | 4/1967 | Mytinger |
| 3,323,814 A | 6/1967 | Phillips |
| 3,337,008 A | 8/1967 | Trachte |
| 3,356,111 A | 12/1967 | Mitchell |
| 3,386,322 A | 6/1968 | Stone et al. |
| 3,439,183 A | 4/1969 | Hurst, Jr. |
| 3,445,835 A | 5/1969 | Fudaley |
| 3,454,286 A | 7/1969 | Anderson et al. |
| 3,456,696 A | 7/1969 | Gregory et al. |
| 3,512,440 A | 5/1970 | Frydmann |
| 3,538,964 A | 11/1970 | Warrick et al. |
| 3,540,338 A | 11/1970 | McEwan et al. |
| 3,554,067 A | 1/1971 | Scutella |
| 3,566,996 A | 3/1971 | Crossman |
| 3,580,376 A | 5/1971 | Loshbough |
| 3,581,784 A | 6/1971 | Warrick |
| 3,593,266 A | 7/1971 | Van Sickle |
| 3,613,748 A | 10/1971 | De Pue |
| 3,621,894 A | 11/1971 | Niksich |
| 3,670,788 A | 6/1972 | Pollak et al. |
| 3,675,444 A | 7/1972 | Whipple |
| 3,680,609 A | 8/1972 | Menge |
| 3,688,815 A | 9/1972 | Ridenour |
| 3,695,116 A | 10/1972 | Baur |
| 3,696,844 A | 10/1972 | Bernatschek |
| 3,716,113 A | 2/1973 | Kobayashi et al. |
| 3,719,103 A | 3/1973 | Streander |
| 3,745,546 A | 7/1973 | Struger et al. |
| 3,749,933 A | 7/1973 | Davidson |
| 3,754,493 A | 8/1973 | Niehaus et al. |
| 3,772,590 A | 11/1973 | Mikulecky et al. |
| 3,785,230 A | 1/1974 | Lokey |
| 3,793,915 A | 2/1974 | Hujer |
| 3,805,639 A | 4/1974 | Peter |
| 3,805,658 A | 4/1974 | Scott et al. |
| 3,808,932 A | 5/1974 | Russell |
| 3,829,850 A | 8/1974 | Guetersloh |
| 3,829,970 A | 8/1974 | Anderson |
| 3,858,095 A | 12/1974 | Friemann et al. |
| 3,861,016 A | 1/1975 | Johnson et al. |
| 3,863,208 A | 1/1975 | Balban |
| 3,880,032 A | 4/1975 | Green |
| 3,882,744 A | 5/1975 | McCarroll |
| 3,886,413 A | 5/1975 | Dow et al. |
| 3,889,567 A | 6/1975 | Sato et al. |
| 3,922,785 A | 12/1975 | Fushiya |
| 3,924,688 A | 12/1975 | Cooper et al. |
| 3,931,727 A | 1/1976 | Luenser |
| 3,935,777 A | 2/1976 | Bassett |
| 3,945,286 A | 3/1976 | Smith |
| 3,946,631 A | 3/1976 | Malm |
| 3,947,734 A | 3/1976 | Fyler |
| 3,949,636 A | 4/1976 | Ball et al. |
| 3,953,770 A | 4/1976 | Hayashi |
| 3,960,310 A | 6/1976 | Nussbaum |
| 3,967,161 A | 6/1976 | Lichtblau |
| 3,974,565 A | 8/1976 | Ellis |
| 3,975,600 A | 8/1976 | Marston |
| 3,978,624 A | 9/1976 | Merkel et al. |
| 3,994,192 A | 11/1976 | Faig |
| 4,007,679 A | 2/1977 | Edwards |
| 4,016,490 A | 4/1977 | Weckenmann et al. |
| 4,026,174 A | 5/1977 | Fierro |
| 4,026,177 A | 5/1977 | Lokey |
| 4,029,159 A | 6/1977 | Nymann |
| 4,047,156 A | 9/1977 | Atkins |
| 4,048,886 A | 9/1977 | Zettler |
| 4,060,160 A | 11/1977 | Lieber |
| 4,070,940 A | 1/1978 | McDaniel et al. |
| 4,075,961 A | 2/1978 | Harris |
| 4,077,161 A | 3/1978 | Wyle et al. |
| 4,085,303 A | 4/1978 | McIntyre et al. |
| 4,090,345 A | 5/1978 | Harkness |
| 4,091,698 A | 5/1978 | Obear et al. |
| 4,106,378 A | 8/1978 | Kaiser |
| 4,117,752 A | 10/1978 | Yoneda |
| 4,145,940 A | 3/1979 | Woloveke et al. |
| 4,152,833 A | 5/1979 | Phillips |
| 4,161,649 A | 7/1979 | Klos et al. |
| 4,175,452 A | 11/1979 | Idel |
| 4,190,000 A | 2/1980 | Shaull et al. |
| 4,195,722 A | 4/1980 | Anderson et al. |
| 4,199,930 A | 4/1980 | Lebet et al. |
| 4,206,666 A | 6/1980 | Ashton |
| 4,206,910 A | 6/1980 | Biesemeyer |
| 4,249,117 A | 2/1981 | Leukhardt et al. |
| 4,249,442 A | 2/1981 | Fittery |
| 4,262,278 A | 4/1981 | Howard et al. |
| 4,267,914 A | 5/1981 | Saar |
| 4,270,427 A | 6/1981 | Colberg et al. |
| 4,276,459 A | 6/1981 | Willett et al. |
| 4,276,799 A | 7/1981 | Muehling |
| 4,291,794 A | 9/1981 | Bauer |
| 4,305,442 A | 12/1981 | Currie |
| 4,321,841 A | 3/1982 | Felix |
| 4,372,202 A | 2/1983 | Cameron |
| 4,391,358 A | 7/1983 | Haeger |
| 4,418,597 A | 12/1983 | Krusemark et al. |
| 4,427,042 A | 1/1984 | Mitchell et al. |
| 4,466,170 A | 8/1984 | Davis |
| 4,466,233 A | 8/1984 | Thesman |
| 4,470,046 A | 9/1984 | Betsill |
| 4,510,489 A | 4/1985 | Anderson, III et al. |
| 4,512,224 A | 4/1985 | Terauchi |
| 4,518,043 A | 5/1985 | Anderson et al. |
| 4,522,094 A * | 6/1985 | Messe et al. .................... 83/92 |
| 4,532,501 A | 7/1985 | Hoffman |
| 4,532,844 A | 8/1985 | Chang et al. |
| 4,557,168 A | 12/1985 | Tokiwa |
| 4,559,858 A | 12/1985 | Laskowski et al. |
| 4,560,033 A | 12/1985 | DeWoody et al. |
| 4,566,512 A | 1/1986 | Wilson |
| 4,573,556 A | 3/1986 | Andreasson |
| 4,576,073 A | 3/1986 | Stinson |
| 4,589,047 A | 5/1986 | Gaus et al. |
| 4,589,860 A | 5/1986 | Brandenstein et al. |
| 4,599,597 A | 7/1986 | Rotbart |
| 4,599,927 A | 7/1986 | Eccardt et al. |
| 4,606,251 A | 8/1986 | Boileau |
| 4,615,247 A | 10/1986 | Berkeley |
| 4,621,300 A | 11/1986 | Summerer |
| 4,625,604 A | 12/1986 | Handler et al. |
| 4,637,188 A | 1/1987 | Crothers |
| 4,637,289 A | 1/1987 | Ramsden |
| 4,644,832 A | 2/1987 | Smith |
| 4,653,189 A | 3/1987 | Andreasson |
| 4,657,428 A | 4/1987 | Wiley |
| 4,672,500 A | 6/1987 | Tholome et al. |
| 4,675,664 A | 6/1987 | Cloutier et al. |
| 4,679,719 A | 7/1987 | Kramer |
| 4,722,021 A | 1/1988 | Hornung et al. |
| 4,751,603 A | 6/1988 | Kwan |
| 4,756,220 A | 7/1988 | Olsen et al. |
| 4,757,881 A | 7/1988 | Jonsson et al. |
| 4,774,866 A | 10/1988 | Dehari et al. |
| 4,792,965 A | 12/1988 | Morgan |
| 4,805,504 A | 2/1989 | Fushiya et al. |
| 4,831,279 A | 5/1989 | Ingraham |

| | | | | | |
|---|---|---|---|---|---|
| 4,840,135 A | 6/1989 | Yamauchi | 5,606,889 A | 3/1997 | Bielinski et al. |
| 4,845,476 A | 7/1989 | Rangeard et al. | 5,619,896 A | 4/1997 | Chen |
| 4,864,455 A | 9/1989 | Shimomura et al. | 5,623,860 A | 4/1997 | Schoene et al. |
| 4,875,398 A | 10/1989 | Taylor et al. | 5,647,258 A | 7/1997 | Brazell et al. |
| 4,896,607 A | 1/1990 | Hall et al. | 5,648,644 A | 7/1997 | Nagel |
| 4,906,962 A | 3/1990 | Duimstra | 5,659,454 A | 8/1997 | Vermesse |
| 4,907,679 A | 3/1990 | Menke | 5,667,152 A | 9/1997 | Mooring |
| 4,934,233 A | 6/1990 | Brundage et al. | 5,671,633 A | 9/1997 | Wagner |
| 4,936,876 A | 6/1990 | Reyes | 5,695,306 A | 12/1997 | Nygren, Jr. |
| 4,937,554 A | 6/1990 | Herman | 5,700,165 A | 12/1997 | Harris et al. |
| 4,964,450 A | 10/1990 | Hughes et al. | 5,722,308 A | 3/1998 | Ceroll et al. |
| 4,965,909 A | 10/1990 | McCullough et al. | 5,724,875 A | 3/1998 | Meredith et al. |
| 4,975,798 A | 12/1990 | Edwards et al. | 5,730,165 A | 3/1998 | Philipp |
| 5,020,406 A | 6/1991 | Sasaki et al. | 5,741,048 A | 4/1998 | Eccleston |
| 5,025,175 A | 6/1991 | Dubois, III | 5,755,148 A | 5/1998 | Stumpf et al. |
| 5,042,348 A | 8/1991 | Brundage et al. | 5,771,742 A | 6/1998 | Bokaie et al. |
| 5,046,426 A | 9/1991 | Julien et al. | 5,782,001 A | 7/1998 | Gray |
| 5,052,255 A | 10/1991 | Gaines | 5,787,779 A | 8/1998 | Garuglieri |
| 5,074,047 A | 12/1991 | King | 5,791,057 A | 8/1998 | Nakamura et al. |
| 5,081,406 A | 1/1992 | Hughes et al. | 5,791,223 A | 8/1998 | Lanzer |
| 5,082,316 A | 1/1992 | Wardlaw | 5,791,224 A | 8/1998 | Suzuki et al. |
| 5,083,973 A | 1/1992 | Townsend | 5,791,441 A | 8/1998 | Matos et al. |
| 5,086,890 A | 2/1992 | Turczyn et al. | 5,819,619 A | 10/1998 | Miller et al. |
| 5,094,000 A | 3/1992 | Becht et al. | 5,852,951 A | 12/1998 | Santi |
| 5,116,249 A | 5/1992 | Shiotani et al. | 5,857,507 A | 1/1999 | Puzio et al. |
| 5,119,555 A | 6/1992 | Johnson | 5,861,809 A | 1/1999 | Eckstein et al. |
| 5,122,091 A | 6/1992 | Townsend | 5,875,698 A | 3/1999 | Ceroll et al. |
| 5,174,349 A | 12/1992 | Svetlik et al. | 5,880,954 A | 3/1999 | Thomson et al. |
| 5,184,534 A | 2/1993 | Lee | 5,921,367 A | 7/1999 | Kashioka et al. |
| 5,198,702 A | 3/1993 | McCullough et al. | 5,927,857 A | 7/1999 | Ceroll et al. |
| 5,199,343 A | 4/1993 | OBanion | 5,930,096 A | 7/1999 | Kim |
| 5,201,110 A | 4/1993 | Bane | 5,937,720 A | 8/1999 | Itzov |
| 5,201,684 A | 4/1993 | DeBois, III | 5,942,975 A | 8/1999 | Sorensen |
| 5,206,625 A | 4/1993 | Davis | 5,943,932 A | 8/1999 | Sberveglieri |
| 5,207,253 A | 5/1993 | Hoshino et al. | 5,950,514 A | 9/1999 | Benedict et al. |
| 5,212,621 A | 5/1993 | Panter | 5,963,173 A | 10/1999 | Lian et al. |
| 5,218,189 A | 6/1993 | Hutchison | 5,974,927 A | 11/1999 | Tsune |
| 5,231,359 A | 7/1993 | Masuda et al. | 5,989,116 A | 11/1999 | Johnson et al. |
| 5,231,906 A | 8/1993 | Kogej | 6,009,782 A | 1/2000 | Tajima et al. |
| 5,239,978 A | 8/1993 | Plangetis | 6,018,284 A | 1/2000 | Rival et al. |
| 5,245,879 A | 9/1993 | McKeon | 6,037,729 A | 3/2000 | Woods et al. |
| 5,257,570 A | 11/1993 | Shiotani et al. | D422,290 S | 4/2000 | Welsh et al. |
| 5,265,510 A | 11/1993 | Hoyer-Ellefsen | 6,052,884 A | 4/2000 | Steckler et al. |
| 5,272,946 A * | 12/1993 | McCullough et al. ......... 83/58 | 6,062,121 A | 5/2000 | Ceroll et al. |
| 5,276,431 A | 1/1994 | Piccoli et al. | 6,070,484 A | 6/2000 | Sakamaki |
| 5,285,708 A | 2/1994 | Bosten et al. | 6,095,092 A | 8/2000 | Chou |
| 5,293,802 A | 3/1994 | Shiotani et al. | 6,112,785 A | 9/2000 | Yu |
| 5,320,382 A | 6/1994 | Goldstein et al. | 6,119,984 A | 9/2000 | Devine |
| 5,321,230 A | 6/1994 | Shanklin et al. | 6,131,629 A | 10/2000 | Puzio et al. |
| 5,331,875 A | 7/1994 | Mayfield | 6,133,818 A | 10/2000 | Hsieh et al. |
| 5,353,670 A | 10/1994 | Metzger, Jr. | 6,141,192 A | 10/2000 | Garzon |
| 5,377,554 A | 1/1995 | Reulein et al. | 6,148,504 A | 11/2000 | Schmidt et al. |
| 5,377,571 A | 1/1995 | Josephs | 6,148,703 A | 11/2000 | Ceroll et al. |
| 5,392,568 A | 2/1995 | Howard, Jr. et al. | 6,150,826 A | 11/2000 | Hokodate et al. |
| 5,392,678 A | 2/1995 | Sasaki et al. | 6,161,459 A | 12/2000 | Ceroll et al. |
| 5,401,928 A | 3/1995 | Kelley | 6,170,370 B1 | 1/2001 | Sommerville |
| 5,411,221 A | 5/1995 | Collins et al. | 6,244,149 B1 | 6/2001 | Ceroll et al. |
| 5,423,232 A | 6/1995 | Miller et al. | 6,250,190 B1 | 6/2001 | Ceroll et al. |
| 5,436,613 A | 7/1995 | Ghosh et al. | 6,257,061 B1 | 7/2001 | Nonoyama et al. |
| 5,447,085 A | 9/1995 | Gochnauer | 6,325,195 B1 | 12/2001 | Doherty |
| 5,451,750 A | 9/1995 | An | 6,330,848 B1 | 12/2001 | Nishio et al. |
| 5,453,903 A | 9/1995 | Chow | 6,336,273 B1 | 1/2002 | Nilsson et al. |
| 5,471,888 A | 12/1995 | McCormick | 6,352,137 B1 | 3/2002 | Stegall et al. |
| 5,480,009 A | 1/1996 | Wieland et al. | 6,357,328 B1 | 3/2002 | Ceroll et al. |
| 5,503,059 A | 4/1996 | Pacholok | 6,366,099 B1 | 4/2002 | Reddi |
| 5,510,587 A | 4/1996 | Reiter | 6,376,939 B1 | 4/2002 | Suzuki et al. |
| 5,510,685 A | 4/1996 | Grasselli | 6,404,098 B1 | 6/2002 | Kayama et al. |
| 5,513,548 A | 5/1996 | Garuglieri | 6,405,624 B2 | 6/2002 | Sutton |
| 5,531,147 A | 7/1996 | Serban | 6,418,829 B1 | 7/2002 | Pilchowski |
| 5,534,836 A | 7/1996 | Schenkel et al. | 6,420,814 B1 | 7/2002 | Bobbio |
| 5,572,916 A | 11/1996 | Takano | 6,427,570 B1 | 8/2002 | Miller et al. |
| 5,587,618 A | 12/1996 | Hathaway | 6,430,007 B1 | 8/2002 | Jabbari |
| 5,592,353 A | 1/1997 | Shinohara et al. | 6,431,425 B1 | 8/2002 | Moorman et al. |

| | | |
|---|---|---|
| 6,450,077 B1 | 9/2002 | Ceroll et al. |
| 6,453,786 B1 | 9/2002 | Ceroll et al. |
| 6,460,442 B2 | 10/2002 | Talesky et al. |
| 6,471,106 B1 | 10/2002 | Reining |
| 6,479,958 B1 | 11/2002 | Thompson et al. |
| 6,484,614 B1 | 11/2002 | Huang |
| D466,913 S | 12/2002 | Ceroll et al. |
| 6,492,802 B1 | 12/2002 | Bielski |
| D469,354 S | 1/2003 | Curtsinger |
| 6,502,493 B1 | 1/2003 | Eccardt et al. |
| 6,536,536 B1 | 3/2003 | Gass et al. |
| 6,543,324 B2 | 4/2003 | Dils |
| 6,546,835 B2 | 4/2003 | Wang |
| 6,564,909 B1 | 5/2003 | Razzano |
| 6,575,067 B2 | 6/2003 | Parks et al. |
| 6,578,460 B2 | 6/2003 | Sartori |
| 6,578,856 B2 | 6/2003 | Kahle |
| 6,581,655 B2 | 6/2003 | Huang |
| 6,595,096 B2 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,659,233 B2 | 12/2003 | DeVlieg |
| 6,684,750 B2 | 2/2004 | Yu |
| 6,722,242 B2 | 4/2004 | Chuang |
| 6,734,581 B1 | 5/2004 | Griffis |
| 6,736,042 B2 | 5/2004 | Behne et al. |
| 6,742,430 B2 | 6/2004 | Chen |
| 6,796,208 B1 | 9/2004 | Jorgensen |
| 6,800,819 B2 | 10/2004 | Sato et al. |
| 6,826,988 B2 | 12/2004 | Gass et al. |
| 6,826,992 B1 | 12/2004 | Huang |
| 6,840,144 B2 | 1/2005 | Huang |
| 6,854,371 B2 | 2/2005 | Yu |
| 6,857,345 B2 | 2/2005 | Gass et al. |
| 6,874,397 B2 | 4/2005 | Chang |
| 6,874,399 B2 | 4/2005 | Lee |
| 6,877,410 B2 | 4/2005 | Gass et al. |
| 6,880,440 B2 | 4/2005 | Gass et al. |
| 6,883,397 B2 | 4/2005 | Kimizuka |
| 6,889,585 B1 | 5/2005 | Harris et al. |
| 6,920,814 B2 | 7/2005 | Gass et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,968,767 B2 | 11/2005 | Yu |
| 6,986,370 B1 | 1/2006 | Schoene et al. |
| 6,994,004 B2 | 2/2006 | Gass et al. |
| 6,997,090 B2 | 2/2006 | Gass et al. |
| 7,000,514 B2 | 2/2006 | Gass et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 * | 2/2002 | Gass et al. ............... 83/477.2 |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0043776 A1 | 4/2002 | Chuang |
| 2002/0050201 A1 | 5/2002 | Lane et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0069734 A1 | 6/2002 | Gass et al. |
| 2002/0096030 A1 | 7/2002 | Wang |
| 2002/0109036 A1 | 8/2002 | Denen et al. |
| 2002/0170399 A1 | 11/2002 | Gass et al. |
| 2002/0170400 A1 * | 11/2002 | Gass ............... 83/62.1 |
| 2002/0190581 A1 | 12/2002 | Gass et al. |
| 2003/0000359 A1 | 1/2003 | Eccardt et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0019341 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0058121 A1 | 3/2003 | Gass et al. |
| 2003/0074873 A1 | 4/2003 | Freiberg et al. |
| 2003/0089212 A1 | 5/2003 | Parks et al. |
| 2003/0090224 A1 | 5/2003 | Gass et al. |
| 2003/0101857 A1 | 6/2003 | Chuang |
| 2003/0109798 A1 | 6/2003 | Kermani |
| 2003/0131703 A1 | 7/2003 | Gass et al. |
| 2003/0140749 A1 | 7/2003 | Gass et al. |
| 2004/0011177 A1 | 1/2004 | Huang |
| 2004/0040426 A1 | 3/2004 | Gass et al. |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0066784 A1 | 3/2005 | Gass |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |

FOREIGN PATENT DOCUMENTS

| | | |
|---|---|---|
| CH | 297525 | 6/1954 |
| DE | 76186 | 8/1921 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |

| | | |
|---|---|---|
| GB | 2142571 | 1/1985 |

OTHER PUBLICATIONS

Skil Model 3400-Type 1 10" Table Saw Parts List and Technical Bulletin, S-B Power Tool Company, Jun. 1993.
Shop Fox® Fence Operating Manual, Woodstock International, Inc., 1996, revised May 1997.
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, Jet Equipment & Tools, Mar. 2001.
XACTA Fence II™ Commercial 30/50 Owner's Manual, Jet Equipment & Tools, Mar. 2001.
Bosch 10" Table Saw Model 0601476139 Parts List and Technical Bulletin, S-B Power Tool Company, Apr. 2001.
Biesemeyer® T-Squaree® Universal Home Shop Fence system Instruction Manual, Delta Machinery, Jun. 1, 2001.
Powermatic 10" Tilting Arbor Saw Model 66 Instruction Manual & Parts List, Jet Equipment & Tools, Jun. 2001.
Skil Model 3400 Table Saw Operating/Safety Instructions, S-B Power Tool Company, Sep. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
Accu-Fence® 64A Fence and Rail System Owner's Manual, WMH Tool Group, Sep. 2004.
Unifence™ Saw Guide Instruction Manual, Delta Machinery, Feb. 22, 2005.
Biesemeyer™ T-Square® Commercial Fence System Instruction Manual, Delta Machinery, May 2, 2005.
Laguna Tools table saw owner's manual, date unknown.
Gordon Engineering Corp., Product Catalog, Oct. 1997, pgs. cover, 1, 3 and back, Brookfield, Connecticut, US.
Analog Devices, Inc., 3-Axis Capacitive Sensor—Preliminary Technical Data AD7103, pp. 1-40, © 1998.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
*You Should Have Invented It*, French television show video.

\* cited by examiner

*Primary Examiner*—Ghassem Alie

(57) ABSTRACT

A band saw including a frame, at least two, spaced apart, rotatable wheels supported by the frame, a blade looped around the wheels, where rotation of at least one wheel causes the blade to move around the wheels, a detection system adapted to detect a dangerous condition between a person and the blade, and a reaction system configured to engage and stop the blade within 10 milliseconds after detection of the dangerous condition is disclosed. The reaction system may be configured to cut and grip the blade.

18 Claims, 6 Drawing Sheets

BAND SAW WITH SAFETY SYSTEM

CROSS-REFERENCE TO RELATED APPLICATIONS

This application is a divisional continuation application of U.S. patent application Ser. No. 10/146,527, filed May 15, 2002, which claims the benefit of and priority from U.S. Provisional Patent Application Ser. No. 60/292,100, filed May 17, 2001. This application is also a continuation of the following U.S. patent applications Ser. No. 09/676,190, filed Sep. 29, 2000, now U.S. Pat. No. 7,055,417,which claims the benefit of and priority from U.S. Provisional Patent Application Ser. No. 60/157,340 filed Oct. 1, 1999 and U.S. Provisional Patent Application Ser. No. 60/182,866 filed Feb. 16, 2000; Ser. No. 09/929,426, filed Aug. 13, 2001, now U.S. Pat. No. 7,210,383, which claims the benefit of and priority from a number of provisional applications including U.S. Provisional Patent Application Ser. No. 60/225,200 filed Aug. 14, 2000; Ser. No. 09/929,221, filed Aug. 13, 2001, now U.S. Pat. No. 7,284,467, which claims the benefit of and priority from a number of provisional applications including U.S. Provisional Patent Application Ser. No. 60/225,211 filed Aug. 14, 2000; Ser. No. 09/929,240, filed Aug. 13, 2001, now U.S. Pat. No. 7,100,483, which claims the benefit of and priority from a number of provisional applications including U.S. Provisional Patent Application Ser. No. 60/225,056 filed Aug. 14, 2000; Ser. No. 09/929,227, filed Aug. 13, 2001, now U.S. Pat. No. 7,308,843,which claims the benefit of and priority from a number of provisional applications including U.S. Provisional Patent Application Ser. No. 60/225,170 filed Aug. 14, 2000; Ser. No. 09/929,241, filed Aug. 13, 2001, now U.S. Pat. No. 7,024,975, which claims the benefit of and priority from a number of provisional applications including U.S. Provisional Patent Application Ser. No. 60/225,169 filed Aug. 14, 2000; Ser. No. 09/929,242, filed Aug. 13, 2001, which claims the benefit of and priority from a number of provisional applications including U.S. Provisional Patent Application Ser. No. 60/225,089 filed Aug. 14, 2000; Ser. No. 09/929,236, filed Aug. 13, 2001, which claims the benefit of and priority from a number of provisional applications including U.S. Provisional Patent Application Ser. No. 60/225,201 filed Aug. 14, 2000; Ser. No. 11/061,162 filed Feb. 18, 2005, now U.S. Pat. No. 7,228,772, which is a continuation of U.S. patent application Ser. No. 09/929,244 filed Aug. 13, 2001 and issuing as U.S. Pat. No. 6,857,345 on Feb. 22, 2005 and which claimed the benefit of and priority from a number of provisional applications including U.S. Provisional Patent Application Ser. No. 60/225,212 filed Aug. 14, 2000; Ser. No. 09/929,237, filed Aug. 13, 2001, which claims the benefit of and priority from a number of provisional applications including U.S. Provisional Patent Application Ser. No. 60/225,059 filed Aug. 14, 2000; Ser. No. 09/929,234, filed Aug. 13, 2001, now U.S. Pat. No. 7,225,712, which claims the benefit of and priority from a number of provisional applications including U.S. Provisional Patent Application Ser. No. 60/225,094 filed Aug. 14, 2000; Ser. No. 09/929,425, filed Aug. 13, 2001, now U.S. Pat. No. 7,137,326, which claims the benefit of and priority from a number of provisional applications including U.S. Provisional Patent Application Ser. No. 60/225,210 filed Aug. 14, 2000; Ser. No. 11/190,111 filed Jul. 25, 2005, now U.S. Pat. No. 7,357,056, which is a continuation of a number of applications including U.S. patent application Ser. No. 09/929,226, filed Aug. 13, 2001 and issuing as U.S. Pat. No. 6,920,814 on Jul. 26, 2005 and which claimed the benefit of and priority from a number of provisional applications including U.S. Provisional Patent Application Ser. No. 60/225,206; Ser. No. 09/929,235, filed Aug. 13, 2001, now U.S. Pat. No. 7,350,444, which claims the benefit of and priority from a number of provisional applications including U.S. Provisional Patent Application Ser. No. 60/225,058 filed Aug. 14, 2000. All of these applications are hereby incorporated by reference in their entirety for all purposes.

This application also hereby incorporates by reference the following PCT patent application: PCT/US00/26812, filed Sep. 29, 2000.

This application further incorporates by reference the following U.S. provisional patent applications: Ser. No. 60/233,459, filed Sep. 18, 2000, Ser. No. 60/270,011, filed Feb. 20, 2001, Ser. No. 60/270,941, filed Feb. 22, 2001, Ser. No. 60/270,942, filed Feb. 22, 2001, Ser. No. 60/273,178, filed Mar. 2, 2001, Ser. No. 60/273,177, filed Mar. 2, 2001, Ser. No. 60/273,902, filed Mar. 6, 2001, Ser. No. 60/275,594, filed Mar. 13, 2001, Ser. No. 60/275,595, filed Mar. 13, 2001, Ser. No. 60/275,583, filed Mar. 13, 2001, Ser. No. 60/279,313, filed Mar. 27, 2001, and Ser. No. 60/292,081, filed May 17, 2001.

FIELD

The present invention relates to band saws, and more particularly to a band saw with a high-speed safety system.

BACKGROUND

Band saws are a type of woodworking machinery used to cut workpieces of wood, plastic, and other materials. Band saws include two, spaced-apart wheels, and a blade tightly looped around the wheels. The blade is made from a band of metal with teeth on one edge of the band. The blade moves around the wheels when the wheels spin. Band saws also include a table or work surface adjacent the blade and upon which workpieces are placed. A person uses the band saw by placing a workpiece on the table and then sliding the workpiece into the moving blade. Band saws present a risk of injury to users because the blade is exposed when in use. Furthermore, users often must place their hands very close to the blade to position and move workpieces, which increases the chance that an injury will occur.

The present invention provides a band saw with an improved safety system that is adapted to detect the occurrence of one or more dangerous, or triggering, conditions during use of the band saw, such as when a user's body contacts the moving blade. When such a condition occurs, the safety system is actuated to limit or even prevent injury to the user.

DETAILED DESCRIPTION AND BEST MODE

Figure 1:
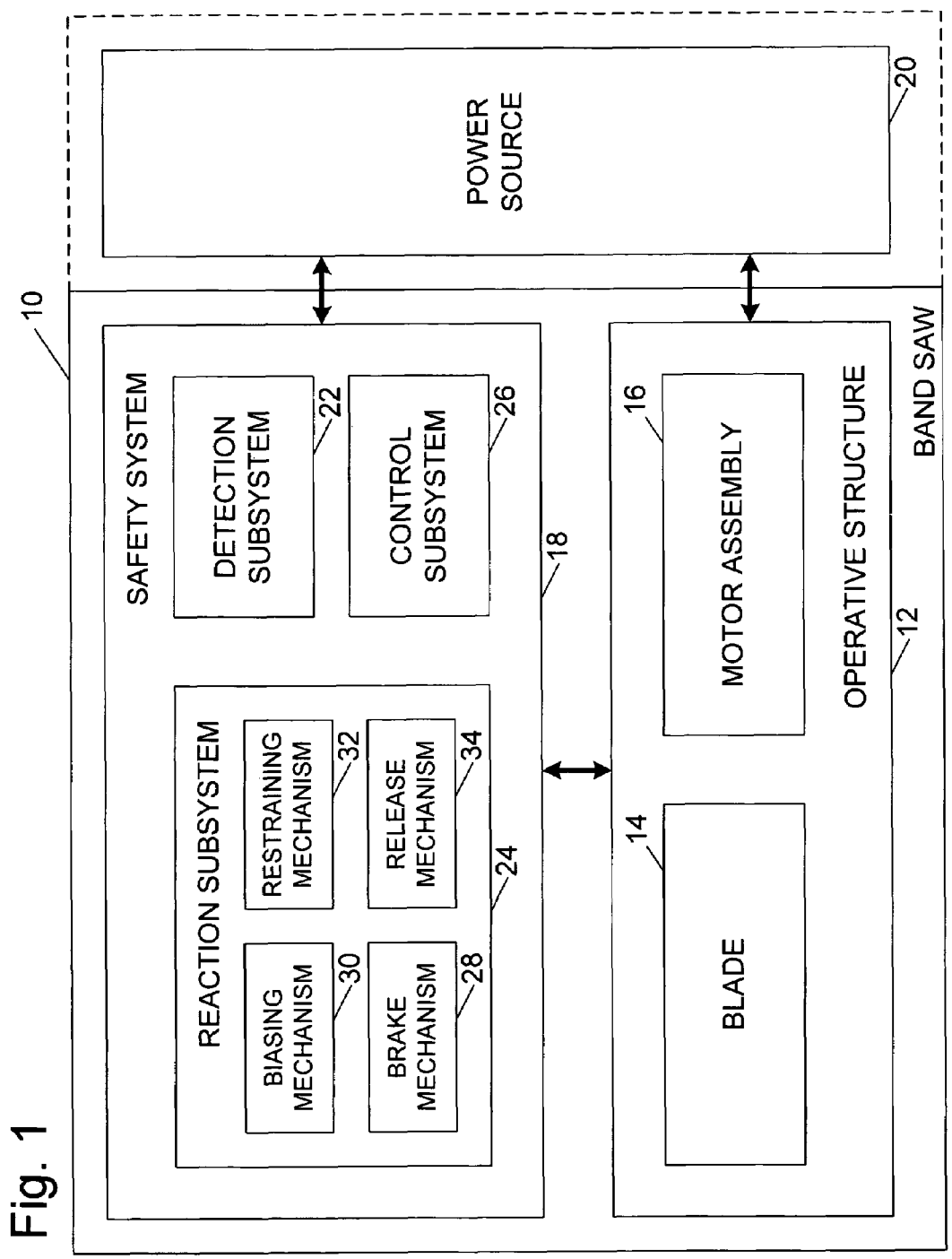
FIG. 1 is a schematic block diagram of a band saw with a fast-acting safety system according to the present invention.

A band saw according to the present invention is shown schematically in FIG. 1 and indicated generally at 10. Band saw 10 may be any of a variety of different types and configurations of band saws adapted for cutting workpieces, such as wood and plastic. Band saw 10 includes an operative structure 12 having a blade 14 and a motor assembly 16 adapted to drive the blade. Band saw 10 also includes a safety system 18 configured to minimize the potential of a serious injury to a person using the band saw. Safety system 18 is adapted to detect the occurrence of one or more dangerous, or triggering, conditions during use of band saw 10. If such a dangerous condition is detected, safety system 18 is adapted to engage operative structure 12 to limit any injury to the user caused by the dangerous condition.

Band saw 10 includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of band saw 10.

It will be appreciated that operative structure 12 may take any one of many different forms, depending on the type of band saw 10. As will be described in more detail below, operative structure 12 typically includes two, spaced-apart wheels and a table adjacent the wheels. A blade 14, made from a band of metal with teeth along one edge of the band, is positioned around the wheels adjacent the table. Motor assembly 16 includes one or more motors adapted to drive blade 14 by spinning at least one of the wheels around which the blade is positioned.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of band saw 10. In addition, control subsystem 26 typically includes one or more instruments operable by a user to control the band saw. The control subsystem is configured to control band saw 10 in response to the inputs it receives.

Detection subsystem 22 is configured to detect one or more dangerous, or triggering, conditions during use of band saw 10. For example, the detection subsystem may be configured to detect that a portion of the user's body is in contact with a portion of blade 14. In some embodiments, detection subsystem 22 may inform control subsystem 26 of the dangerous condition, which then activates reaction subsystem 24. In other embodiments, the detection subsystem may be adapted to activate the reaction subsystem directly. Various exemplary embodiments and implementations of detection subsystem 22 are described in more detail in U.S. Provisional Patent Application Ser. No. 60/225,200, entitled "Contact Detection System for Power Equipment," filed Aug. 14, 2000, by SD3, LLC, the disclosure of which is incorporated herein by reference.

Once activated in response to a dangerous condition, reaction subsystem 24 is configured to quickly engage operative structure 12 to prevent serious injury to the user. It will be appreciated that the particular action to be taken by reaction subsystem 24 will vary depending on the type of band saw 10 and/or the dangerous condition that is detected. For example, reaction subsystem 24 may be configured to do one or more of the following: stop the movement of blade 14 by cutting the blade and/or by gripping the blade, disconnect motor assembly 16 from power source 20, retract the blade from its operating position, etc.

The configuration of reaction subsystem 24 typically will vary depending on which action(s) are taken. In the exemplary embodiment depicted in FIG. 1, reaction subsystem 24 is configured to stop the movement of blade 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of band saw 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the blade to a stop.

Control subsystem 26 includes one or more instruments that are operable by a user to control the motion of blade 14. Those instruments may include start/stop switches, speed controls, etc. Control subsystem 26 typically includes a logic controller connected to receive the user's inputs via the instruments. The logic controller is also connected to receive a contact detection signal from detection subsystem 22. Further, the logic controller may be configured to receive inputs from other sources, such as blade motion sensors, workpiece sensors, etc. In any event, the logic controller is configured to control operative structure 12 in response to the user's inputs. However, upon receipt of a contact detection signal from detection subsystem 22, the logic controller overrides the control inputs from the user and activates reaction subsystem 24 to stop the motion of the blade. Various exemplary embodiments and implementations of control subsystem 26, including the logic controller, are described in more detail in U.S. Provisional Patent Application Ser. No. 60/225,059, entitled "Logic Control For Fast Acting Safety System," filed Aug. 14, 2000 by SD3, LLC, and in U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

Figure 2:
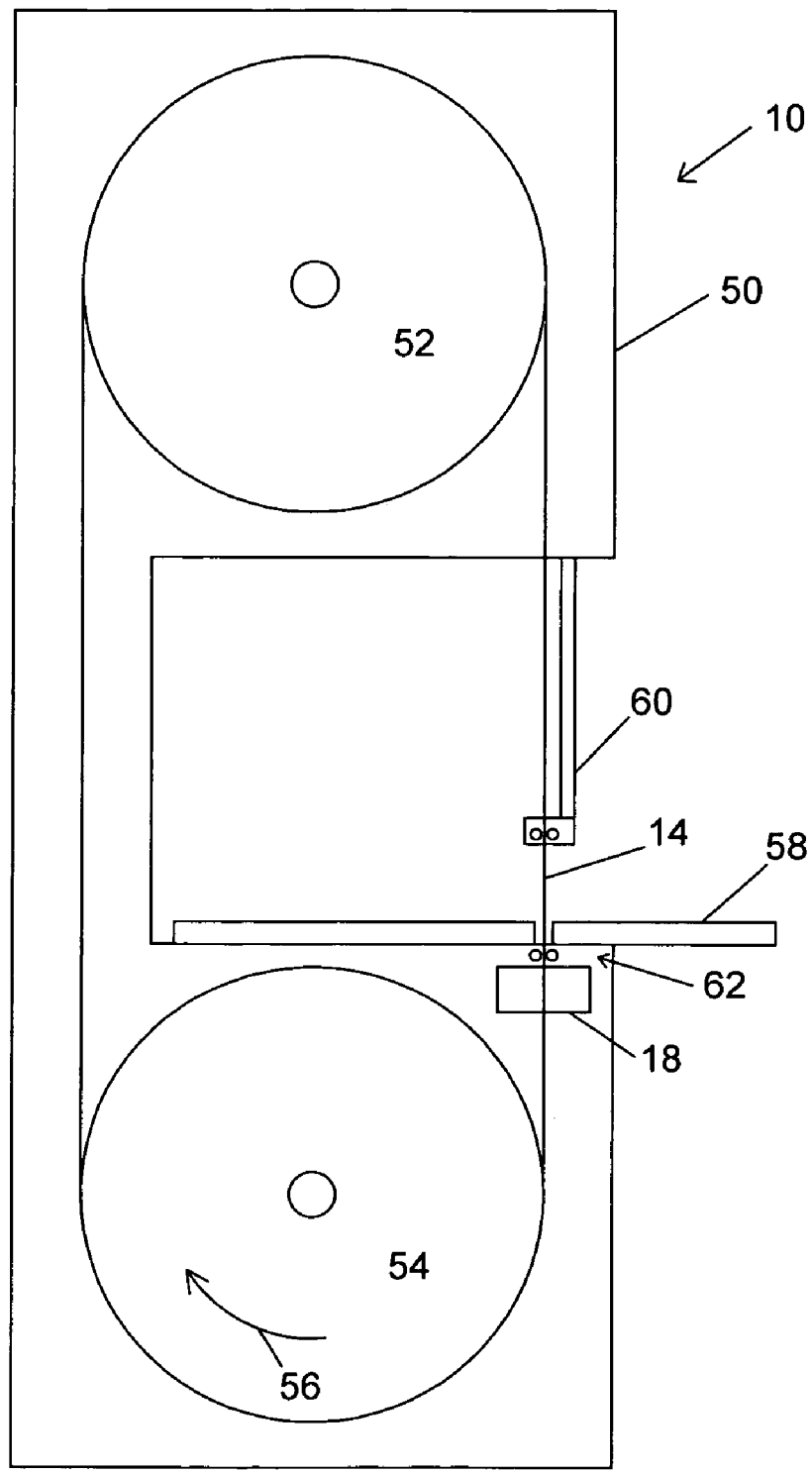
FIG. 2 is a schematic side elevation of an embodiment of a band saw according to the present invention.

One embodiment of band saw 10 is shown specifically in FIG. 2. It includes a main housing 50 enclosing a pair of spaced-apart wheels 52 and 54. Wheels 52 and 54 are supported for rotational movement by housing 50. Housing 50 also typically encloses the wheels to prevent a user from touching them while they are spinning. The perimeter of each wheel may be coated or covered in a high-friction material such as rubber, etc. A relatively thin, continuous loop, tooth-edged blade 14 tightly encircles both wheels. Wheel 54 is driven by motor assembly 16 (not shown in FIG. 2) so that it rotates in the direction of arrow 56. Rotating wheel 54 causes blade 14 to move, which in turn, causes wheel 52 to rotate. Blade 14 moves adjacent table 58. A workpiece is cut by sliding the workpiece on table 58 into the teeth of moving blade 14 between wheels 52 and 54. An upper blade-guide assembly 60 and a lower blade-guide assembly 62 maintain the moving blade in a stable path.

Band saw 10 includes a detection subsystem 22 to detect when a person's body comes into contact with blade 14. Detection subsystem 22 is based on the capacitance of a human body. It is believed that the capacitance of a user's body, as measured through dry contact with a portion of the user's body, is approximately 25-200 picofarads. That capacitance tends to increase with increasing body size and with increased coupling between the user's body and an electrical ground. As a result of the inherent capacitance of a user's body, when the user touches blade 14, the capacitance of the user's body is electrically coupled to the inherent capacitance of the blade, thereby creating an effective capacitance that is larger than the inherent capacitance of the blade alone. Detection subsystem 22 is configured to measure or monitor the capacitance of the blade, so that any substantial change in the measured capacitance would indicate contact between the user's body and the blade.

Figure 3:
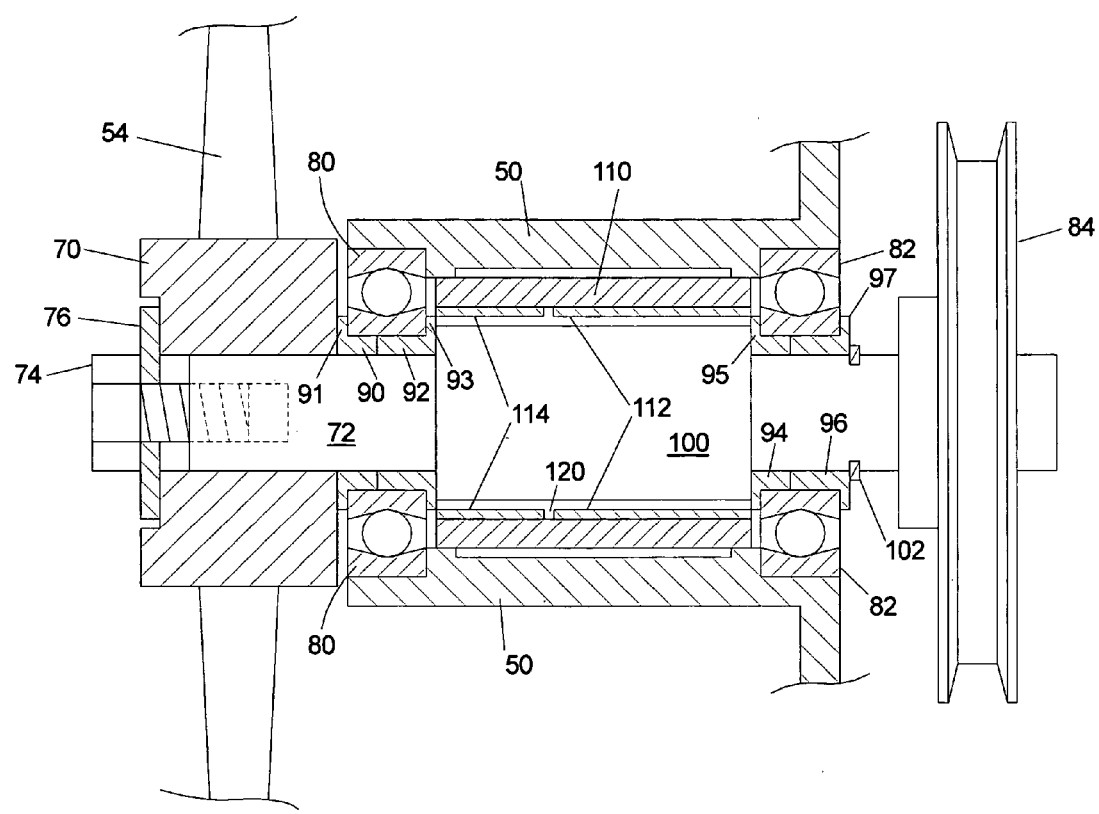
FIG. 3 shows a wheel mount with a capacitive coupling used in the band saw of FIG. 2.

FIG. 3 shows a capacitive coupling that may be used as part of detection subsystem 22 in measuring the capacitance of the blade to detect contact between the blade and a person. In FIG. 3, wheel 54 is shown mounted on an arbor or shaft 72 by a bolt 74 and washer 76. Arbor 72 extends through a hub 70 on the wheel, and bolt 74 is threaded into the arbor and presses against hub 70 to hold the wheel on the arbor.

Arbor 72 is supported for rotational movement by bearings 80 and 82, which are mounted in a portion of housing 50, and which are spaced along the length of the arbor. Bearings 80 and 82 do not directly contact arbor 72 or wheel 54. Rather, arbor 72 and wheel 54 are electrically isolated from bearings 80 and 82 by insulating bushings 90, 92, and 94, 96, respectively. Those bushings are configured to extend around the arbor, to receive the bearings, and to hold the arbor and wheel away from the bearings and housing so there is no metal-to-metal contact between the bearings/housing and the wheel/arbor. The bushings may be made from many different insulating materials, such as PET-P or some other hard plastic. Bushings 90 and 92 are held in place between wheel hub 70 and an enlarged portion 100 on the arbor that has a greater diameter than the rest of the arbor. Bushings 94 and 96, in turn, are positioned between enlarged portion 100 and a snap ring 102 on the arbor. In this manner, wheel 54 is supported by housing 50 for rotational movement, but is also electrically isolated from the housing. Bushing 90 includes a flange 91 sandwiched between hub 70 and bearing 80 to prevent the hub from touching the bearing. Similarly, bushing 92 includes a flange 93, and bushing 94 includes a flange 95, preventing enlarged portion 100 from touching either of bearings 80 or 82, and bushing 96 includes a flange 97 preventing snap ring 102 from touching bearing 82. A pulley 84 is mounted on the end of arbor 72 opposite wheel 54, and a belt (not shown) driven by motor assembly 16 may be used to drive pulley 84 and thereby spin arbor 72 and wheel 54 in bearings 80 and 82 to move blade 14. The belt is typically non-conducting and thus does not electrically couple the arbor to the housing.

A cylindrical, insulating sleeve 110 is positioned and securely held around enlarged portion 100 by housing 50. Sleeve 110 may be press-fit into an appropriate receptacle on the housing. Two electrically conductive plates or tubes 112 and 114, having an outer diameter that fits snugly within sleeve 110, are, in turn, press-fit into sleeve 110. Alternatively or additionally, plates 112 and 114 may be glued or otherwise lo mounted in sleeve 110. Sleeve 110 and plates 112 and 114 are coaxial and concentric to enlarged portion 100 of arbor 72. Plates 112 and 114 also have an inner diameter slightly larger than the diameter of enlarged portion 100 so that they do not contact any part of arbor 72. Plates 112 and 114 are spaced apart in sleeve 110 by a gap 120. Plates 112 and 114 may be made from any conductive material, such as brass tubing. Sleeve 110 protects plates 112 and 114 from damage and debris, and also electrically isolates the plates from housing 50.

Plates 112 and 114 may be thought of as contact detection plates that are used to create capacitive couplings with the arbor and blade. Detection subsystem 22 includes suitable electrical circuitry (e.g., such as described in U.S. Provisional Patent Application Ser. No. 60/225,200, entitled "Contact Detection System for Power Equipment," filed Aug. 14, 2000, by SD3, LLC, which is herein incorporated by reference) to transmit an input signal to plate 112, and to detect the input signal through plate 114 via wires (not shown) attached to the plates, which wires may extend from the plates through a hole or holes in sleeve 110 to detection subsystem 22. In other words, detection subsystem 22 imparts a signal on plate 112. That signal then drives a signal onto arbor 72 by virtue of the capacitive coupling between the plate and the arbor. The arbor is conductively coupled to wheel 54, so the signal induced on the arbor is also induced on the wheel. Blade 14 loops around a significant portion of the perimeter of wheel 54, so the signal on the wheel induces a signal on the blade. If wheel 54 includes a non-conductive, high-friction material such as rubber around its periphery to prevent the blade from slipping on the wheel when the wheel is rotated, then a signal is induced on the blade by a capacitive coupling between the blade and the wheel. If blade 14 directly contacts wheel 54, then the signal on the blade is the same as the signal on the wheel because of the conductive contact between the wheel and the blade. The signal on the arbor also induces a signal on plate 114 because of the proximity of the plate to the arbor. Thus, plate 114 monitors the signal on the blade/arbor. When a person touches the blade, the effective capacitance of the blade/arbor combination changes, causing the signal on plate 114 to change, thereby signaling contact between the blade and a person.

Plates 112 and 114 are mounted close to, but spaced-apart from, arbor 72. Those plates are capacitively coupled to the arbor by virtue of their size and placement parallel to and spaced-apart from the arbor. It is within the scope of the present invention that the number, size and placement of charge plates or tubes may vary.

The effect of this arrangement is to form two capacitors in series through the arbor, creating a capacitive shunt at the junction between the capacitors. Plates or tubes 112 and 114 function as charge plates of the capacitors. The input signal is capacitively coupled from plates 112 onto arbor 72, and then capacitively coupled from the arbor to plate 114. Any change in the capacitance of the blade/arbor changes the signal coupled to plate 114.

When a user touches blade 14, the capacitance of the user's body creates a capacitive load on the blade. As a result, the size of the capacitive shunt between plates 112 and 114 and the blade is increased, thereby reducing the charge that reaches plate 114. Thus, the magnitude of the input signal passed through the blade to plate 114 decreases when a user touches the blade. Detection subsystem 22 is configured to detect this change in the input signal and transmit a contact detection signal to control subsystem 26.

In some cases, there may be a significant amount of resistance at the contact point of the user's dry skin and the blade. This resistance may reduce the capacitive coupling of the user's body to the blade. However, when the teeth on the blade penetrate the outer layer of the user's skin, the moisture inherent in the internal tissue of skin will tend to decrease the resistance of the skin/blade contact, thereby establishing a solid electrical connection. The sensitivity of detection subsystem 22 can be adjusted as desired to recognize even slight changes in the input signal.

Generally speaking, the spacing of the charge plates or tubes from the arbor is not critical, and may vary depending on the charge plate area and the desired capacitive coupling.

Blade 14 must be electrically isolated from ground for the signal to be induced on the blade. Additionally, capacitive couplings between the blade and other parts of the saw must be minimized so that the relative increased capacitance caused from a person touching the blade is reliably measurable. In other words, if the blade is capacitively coupled to other items, such as to a blade guard or to the housing, then the increased capacitance from a person touching the blade will be insignificant compared to the combined capacitance of the blade and other items, meaning that the contact by the person will be harder to detect and the detection will be less reliable. Specifically, in a band saw, the blade will present a large surface area to wheel 52 and therefore will capacitively couple to that wheel.

Figure 4:
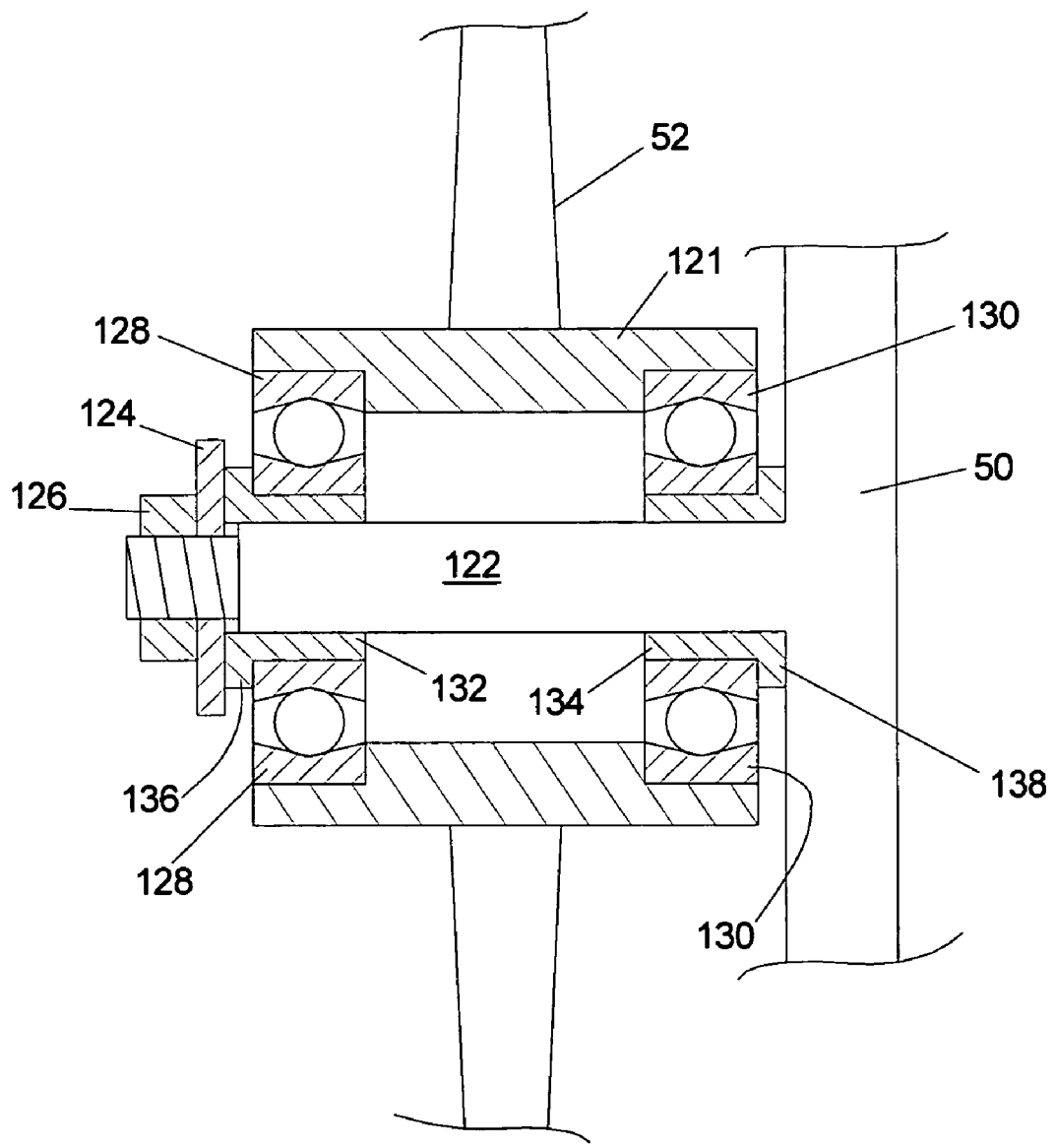
FIG. 4 shows a wheel mount used in the band saw of FIG. 2.

Band saw 10 addresses this issue by electrically isolating wheel 52 from housing 50, as shown in FIG. 4. Wheel 52 includes hub 121, and hub 121 is mounted on spindle 122 by washer 124 and nut 126 threaded onto the spindle. The spindle is mounted to, or is part of, housing 50, so the spindle and housing support the wheel. Bearings 128 and 130 are press fit into appropriate openings in the hub, and the bearings contact spindle 122 and support the hub and wheel on the spindle at spaced apart locations, as shown. The bearings support the wheel for rotational movement on the spindle. Two non-conductive bushings 132 and 134, made from PET-P, a hard plastic, or some other non-conductive material, are positioned between spindle 122 and bearings 128 and 130, respectively, to prevent the bearings from contacting the spindle. Bushing 132 includes a flange 136 sandwiched between bearing 128 and washer 124 to prevent any metal-to-metal contact between the bearing and the washer or spindle. Bushing 134 includes a similar flange 138 sandwiched between bearing 130 and housing 50 to prevent metal-to-metal contact between that bearing and the housing. With this construction, wheel 52 is electrically isolated from housing 50.

Thus, in band saw 10, a charge or signal on plate 112 induces a charge on arbor 72 and wheel 54, which in turn induces a charge on blade 14 and wheel 52. That charge then induces a signal on plate 114, which is monitored by detection subsystem 22. When a person touches the blade, the effective capacitance of the blade/arbor/wheels combination changes, and that change is immediately detected by the detection subsystem. No special or unique blade is required.

It will be appreciated that the size of charge plates 112 and 114 may be selected to provide a desired capacitance with the arbor. Indeed, the size of the charge tubes may be different to provide different capacitances. For example, in the embodiment depicted in FIG. 3, charge plate 112 is longer than charge plate 114, thereby providing a higher capacitance between charge plate 112 and the arbor, than between charge plate 114 and the arbor. Alternatively, or additionally, the inside diameters of the charge tubes may be different to provide different capacitances due to different arbor-to-charge plate spacings.

It will be appreciated that while the charge plates or tubes and insulating sleeve in the exemplary embodiment are cylindrical, other shapes may also be used. For example, insulating sleeve 110 may have a rectangular outer cross-section while maintaining its circular inner cross-section. Likewise, charge plates 112 and 114 may have any suitable outer cross-sectional shape to match the inner shape of the insulating tube.

Since charge plates 112 and 114 should not come into contact with each other, the fit between the charge plates and insulating sleeve 110 is typically tight enough to frictionally prevent movement of the charge plates along the axis of the insulating sleeve. Alternatively, a bump or ring may be formed or positioned on the inner diameter of the insulating sleeve between the charge plates to prevent the charge plates from coming into contact. As a further alternative, caulk, glue, epoxy, or similar material may be applied between the charge plates and insulating sleeve to prevent the charge plates from moving. As another alternative, one or more set-screws may be threaded through the insulating sleeve to bear against the charge tubes, making sure that the set screws do not contact the housing or some other metal that would ground the charge plates.

As explained above, blade 14 should be electrically isolated from housing 50, which is usually grounded. Thus, blade guide assemblies 60 and 62, which may include ball-bearing guides and/or friction pads, etc., are constructed to electrically insulate the blade from the main housing.

Insulating sleeve 110 may also be constructed to receive a Hall Effect or similar sensor to detect blade/arbor rotation, as described in more detail in U.S. Provisional Patent Application Ser. No. 60/225,094, entitled "Motion Detection System for Use in Safety System for Power Equipment," filed Aug. 14, 2000, by SD3, LLC, which is hereby incorporated by reference.

Electrically isolating the blade as described above has the advantage that the blade need not be capacitively isolated from wheels 52 and 54, which is difficult to do effectively. Nevertheless, and alternatively, capacitive couplings to the blade may be created in other ways, such as disclosed in U.S. Provisional Patent Application Ser. No. 60/225,211, entitled "Apparatus and Method for Detecting Dangerous Conditions in Power Equipment," filed Aug. 14, 2000, by SD3, LLC, and incorporated herein by reference.

Figure 5:
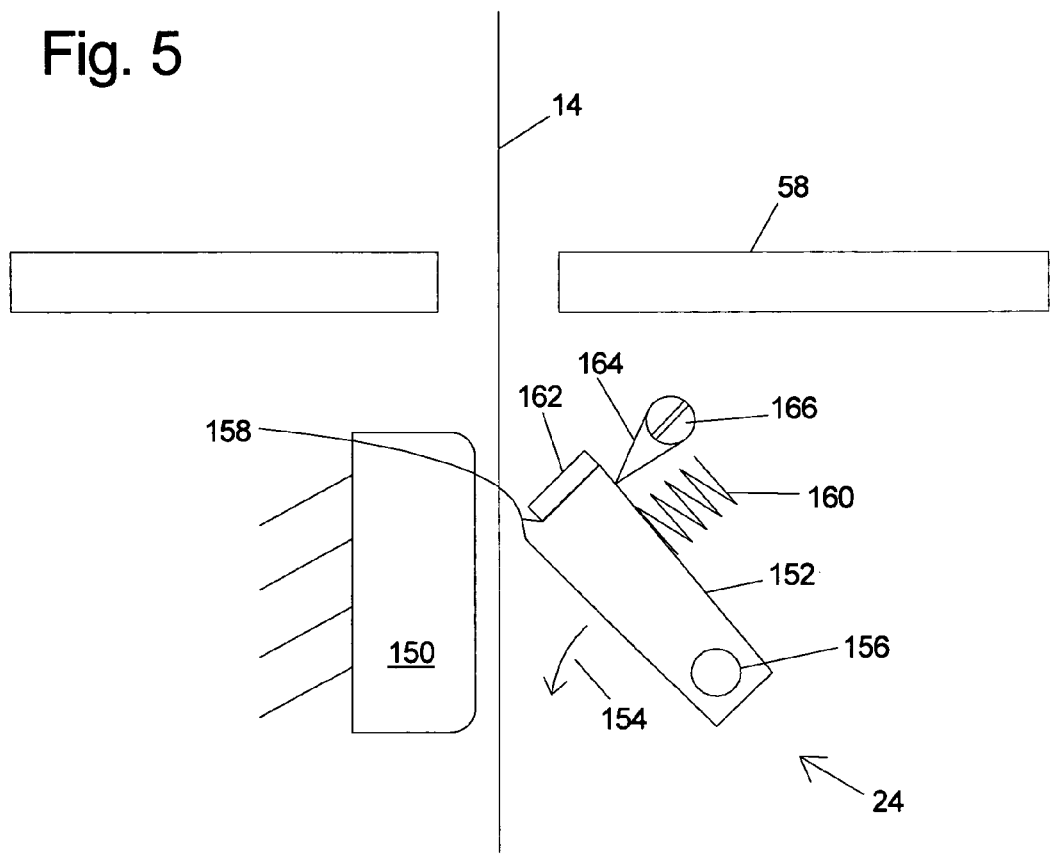
FIG. 5 shows schematically a reaction subsystem that stops a blade by cutting and gripping the blade.

As explained above, when detection subsystem 22 detects contact between blade 14 and a person, reaction subsystem 24 reacts to prevent or limit injury to the person. FIG. 5 shows schematically one embodiment of a reaction system that stops the blade by cutting and gripping the blade. In the illustrated embodiment, reaction subsystem 24 is shown adjacent blade 14 and under table 58. Reaction subsystem 24 includes a backing plate 150 supported by the housing and positioned near one side of blade 14. Backing plate 150 is made of either hardened or non-hardened metal.

A cutting pawl 152 is mounted adjacent backing plate 150 on the opposite side of blade 14. Cutting pawl 152 is made from hardened steel. Cutting pawl 152 is mounted to pivot in the direction of arrow 154 around pivot pin 156 mounted to the housing of the saw. Cutting pawl 152 includes a cutting edge 158 on the end of the pawl opposite pivot pin 156. Pawl 152 is configured to pivot down so that cutting edge 158 contacts blade 14 and cuts the blade against backing plate 150. Cutting pawl 152 and backing plate 150 may be thought of as brake mechanism 28 shown in FIG. 1.

The force to pivot pawl 152 into the blade to cut the blade is, in part, provided by spring 160, which typically is a spring providing approximately 10 to 500 pounds of force. The spring is configured to force pawl 152 in the direction of arrow 154. When spring 160 pushes cutting edge 158 into blade 14, the downward motion of the blade also pushes pawl 152 downward, so that pawl 152 effectively locks on the blade and uses the motion of the blade to help cut the blade. Spring 160 may be thought of as biasing mechanism 30 discussed above.

Cutting pawl 152 also includes a gripping surface 162 to grip the blade and hold it against backing plate 150 both while the blade is cut and thereafter until the pawl is moved back away from the blade. Gripping surface 162 may be simply a surface on the pawl, or it may be a layer of high-friction material such as rubber or plastic, as shown in FIG. 5. Gripping surface 162 also may be thought of as part of brake mechanism 28 discussed above. Gripping surface 162 is optional, and cutting pawl 152 may be made without a gripping surface. In that case, reaction subsystem 24 simply stops the blade by cutting it, without simultaneously gripping the blade.

A fuse wire 164 is used to hold cutting pawl 152 away from blade 14 until the detection subsystem detects that a person has contacted the blade. At that time, a firing subsystem 166 sends a surge of electrical current through fuse wire 164, burning the wire and releasing the cutting pawl. Possible fuse wires and firing subsystems are disclosed in more detail in U.S. Provisional Patent Application Ser. No. 60/225,056, entitled "Firing Subsystem for Use in a Fast-Acting Safety System," filed Aug. 14, 2000, by SD3, LLC, and incorporated herein by reference. A mechanism providing mechanical advantage to hold the cutting pawl away from the blade may be used, as described in U.S. Provisional Patent Application Ser. No. 60/225,056, entitled "Spring-Biased Brake Mechanism for Power Equipment," filed Aug. 14, 2000, by SD3, LLC, and incorporated herein by reference. Fuse wire 164 may be thought of as restraining mechanism 32, and firing subsystem 166 may be thought of as release mechanism 34.

When cutting pawl 152 cuts blade 14, the tension of the blade around wheels 52 and 54 is released and the blade stops immediately. The blade has relatively little mass, and therefore little momentum, so the blade stops without incident. Additionally, the majority of blade 14 is typically within housing 50 so that the housing would contain the blade even if the blade tended to lash out when cut.

Figure 6:
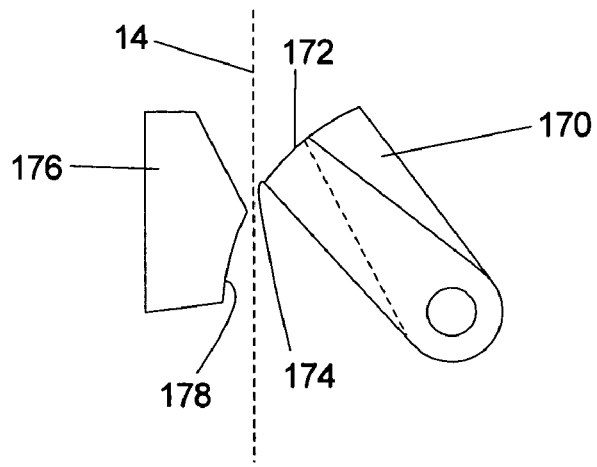
FIG. 6 is a schematic representation of one embodiment of a cutting pawl and backing plate used in a reaction system that stops a blade by cutting the blade.

FIG. 6 shows another type of cutting pawl at 170. Cutting pawl 170 is pivotally mounted to cut blade 14, as described above. Cutting pawl 170 includes a cutting edge 172 that extends helically away from the blade relative to the blade so that the cutting edge first contacts the blade at a point designated at 174, and then progressively moves into and across the blade. The cutting edge may extend helically away from blade 14, as if the pawl had been twisted around an axis perpendicular to the pivot axis of the pawl. Additionally, the pivot point of pawl 170 may be mounted to the housing of the saw so that the pawl pushes blade 14 back, away from where the blade would normally cut, thereby retracting or pushing the blade away from the point where a person most likely would accidentally contact the blade. For example, the pivot may be non-parallel to the table so that the pawl pushes the blade down and back. FIG. 6 also shows a backing plate 176 against which cutting pawl 170 cuts blade 14. Backing plate 176 includes a curved surface 178 that follows the radius of cutting pawl 170 as it pivots. Cutting pawl 170, shown in FIG. 6, may be released to cut blade 14 as described above in connection with the embodiment shown in FIG. 5.

Figure 7:
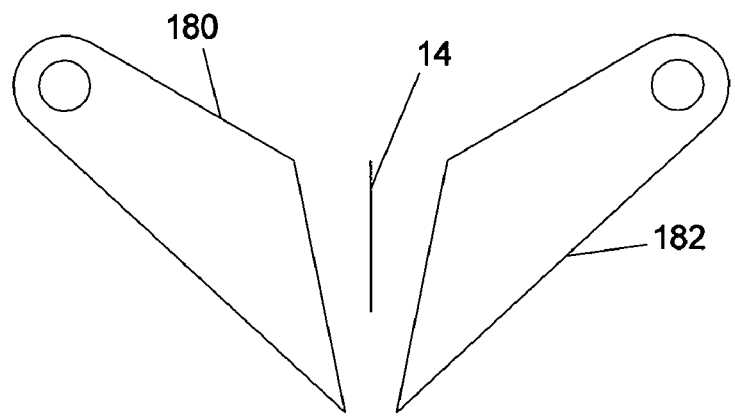
FIG. 7 is a schematic top view of another embodiment of cutting pawls used in a reaction system to stop a blade by cutting the blade.
Figure 8:
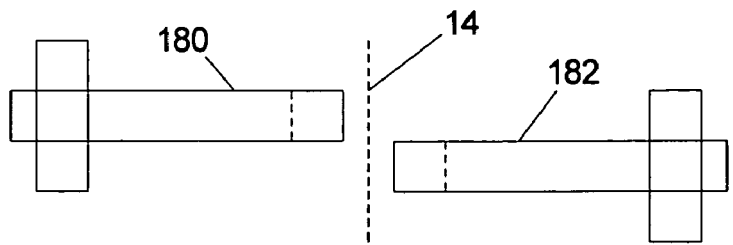
FIG. 8 is a schematic front view of the cutting pawls shown in FIG. 7.

FIG. 7 shows a top view, and FIG. 8 shows a front view, of another way of cutting blade 14 upon the detection of contact between a person and the blade. The embodiment shown in FIGS. 7 and 8 includes two cutting pawls, 180 and 182, each positioned on one side of blade 14, to act like scissors to cut the blade. FIG. 8 shows how the pawls are positioned vertically relative to each other to act like scissors. The pawls would be released by a fuse wire and firing system, and pushed into the blade by springs, as described above. The pawls may be configured to strike the front of blade 14 first so that the pawls retract or push the blade back and away from a user of the saw. Pawls 180 and 182 also could be configured and mounted to the housing to strike blade 14 at an angle so that they lock onto the blade and so that they are self-feeding due to the motion of the blade. Pawls 180 and 182 also could be mounted so that they move down with blade 14 as they cut the blade.

Additionally, any of the cutting pawls described above may have a cutting edge made of carbide or hardened steel.

As described above, the present invention provides a band saw which is substantially safer than existing saws. The band saw includes a safety system adapted to detect the occurrence of a dangerous condition, such as a person accidentally touching the moving blade, and to stop movement of the blade to prevent serious injury to a user. The band saw may be used to cut wood, plastic, or other non-conductive material.

The band saw also may be modified for use in the meat cutting industry. In that case, the detection system would be modified so that a user of the band saw would wear a glove with one or more interior wires on which an electrical signal is induced. When the blade cuts into the glove and contacts the interior wires, the blade would ground the wires and the detection subsystem would detect that the signal on the wires had changed. The reaction system would then trigger as described above.

While several particular exemplary embodiments have been described and illustrated, it will be appreciated that many different modifications and alterations may be made within the scope of the invention.

I claim:

1. A band saw comprising:
   a frame;
   at least two, spaced apart, rotatable wheels supported by the frame;
   a blade looped around the wheels, where rotation of at least one wheel causes the blade to move around the wheels;
   a detection system adapted to detect a dangerous condition between a person and the blade; and
   a reaction system configured to cut the blade upon detection of the dangerous condition.

2. The band saw of claim 1, where the reaction system is further configured to grip the blade upon detection of the dangerous condition.

3. The band saw of claim 1, where the reaction system includes a cutting element.

4. The band saw of claim 3, where the cutting element is configured to pivot against the blade.

5. The band saw of claim 4, where the cutting element is configured so that when it pivots against the blade, the normal motion of the blade tends to move the cutting element further against the blade.

6. The band saw of claim 3, where the cutting element is configured to both cut and grip the blade.

7. The band saw of claim 3, further comprising a spring to bias the cutting element toward the blade.

8. The band saw of claim 3, where the cutting element includes a cutting edge made of carbide or hardened steel.

9. The band saw of claim 3, further comprising a surface against which the cutting element cuts the blade.

10. The band saw of claim 9, where the surface is curved.

11. The band saw of claim 9, where the surface is a backing plate.

12. The band saw of claim 3, where the cutting element includes a cutting edge that extends helically away from the blade.

13. The band saw of claim 1, where the reaction system includes a cutting pawl pivotally mounted to the frame and configured to pivot into contact with the blade, where the cutting pawl is pivotally mounted to the frame at a point so that the pawl pushes the blade away from where the blade would normally cut when the pawl pivots into the blade.

14. The band saw of claim 1, where the reaction system includes two cutting pawls.

15. The band saw of claim 14, where one pawl is positioned on each side of the blade.

16. The band saw of claim 14, where the two cutting pawls are configured as scissors to cut the blade.

17. The band saw of claim 14, where the two cutting pawls are positioned so that they are not coplanar.

18. A band saw comprising:

a frame;

at least two, spaced apart, rotatable wheels supported by the frame;

a blade looped around the wheels, where rotation of at least one wheel causes the blade to move around the wheels;

a detection system adapted to detect a dangerous condition between a person and the blade; and reaction means for cutting the blade upon detection of the dangerous condition.

* * * * *

UNITED STATES PATENT AND TRADEMARK OFFICE
CERTIFICATE OF CORRECTION

PATENT NO. : 7,621,205 B2  Page 1 of 1
APPLICATION NO. : 11/218356
DATED : November 24, 2009
INVENTOR(S) : Stephen F. Gass It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this

Fourteenth Day of December, 2010

David J. Kappos
*Director of the United States Patent and Trademark Office*